Jan. 27, 1959 L. E. WEBER 2,871,069
SELF-LUBRICATING AND RATTLE PREVENTING WASHER
Filed March 7, 1957
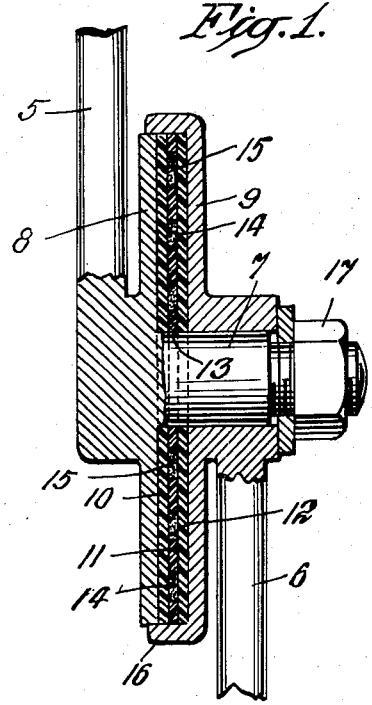
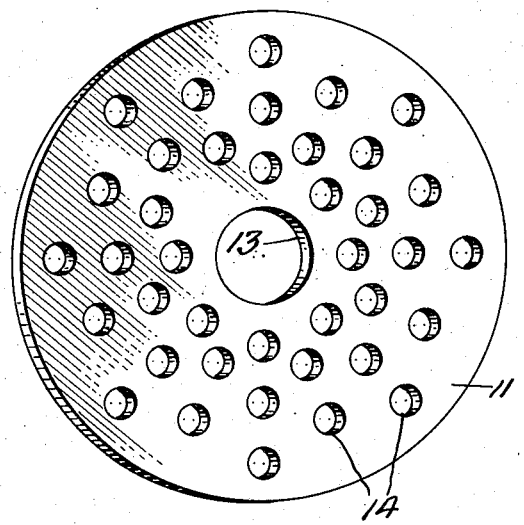
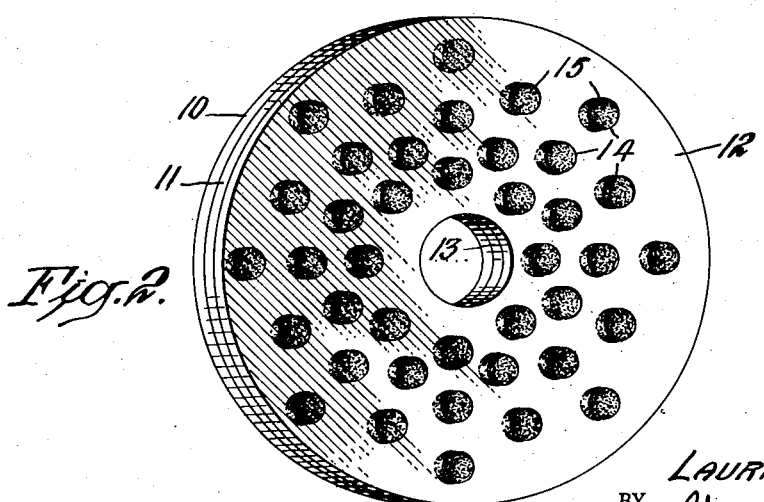
INVENTOR.
LAURA E. WEBER
BY
ATTORNEY

United States Patent Office 2,871,069
Patented Jan. 27, 1959

2,871,069

SELF-LUBRICATING AND RATTLE PREVENTING WASHER

Laura E. Weber, Englewood, N. J.

Application March 7, 1957, Serial No. 644,558

3 Claims. (Cl. 308—135)

The invention herein disclosed relates to washers such as used between relatively movable parts.

The general objects of the invention are to provide a washer construction which may be applied between movable parts like an ordinary washer and which in addition to serving in place of an ordinary washer will provide lubrication for such parts and prevent rattling, squeaking or objectionable noise or looseness between the parts.

Particularly, it is a purpose of the invention to provide a washer for parts which though relatively movable may be only occasionally shifted, such as the bows and levers of convertible tops, the wheels of baby carriages, children's wagons and toys and the like and which through non-use and inattention may stick and squeak and otherwise be more or less out-of-order when again subjected to intended use.

These and other desirable objects have been attained by making up a washer in laminated form and including at least three washer discs of flat soft sheet plastic and including an intermediate disc with grease retaining cavities or openings and two outer discs at opposite sides of the same and imperforate to confine lubricant medium in the cavities aforesaid.

Other novel features of the invention will appear as the specification proceeds.

The drawing accompanying and forming part of the specification illustrates a practical embodiment and use of the invention, but it is realized that changes and modifications may be made within the intent and scope of the invention as hereinafter defined and claimed.

Fig. 1 in the drawing is a broken sectional view showing one of the washers applied and in use between the hingedly connected ends of two members, such as levers of a convertible automobile top, the latter broken and partly in section.

Fig. 2 is a perspective view of the assembled washer, apart from other structure.

Fig. 3 is a perspective view of the center washer disc having grease retaining cavities in the form of perforations extending through the disc.

In Fig. 1, two pivotally or rotatably connected members are shown in the nature of levers 5 and 6, the first carrying a stud, bolt or axle element 7, on which the second member is pivotally engaged and the two members having opposed flanges 8, 9, providing extended bearing faces.

The washer of the present invention is interposed between these opposed bearing faces.

Fig. 2 shows the complete washer unit as made up of three discs 10, 11, 12, of flat sheet or molded pliable plastic, each having a central washer opening 13, the two outer washer discs being otherwise imperforate and the center disc having a series of smaller perforations 14, therethrough containing and to some extent confining graphite or other more or less similar greasy lubricant 15.

When a transparent plastic is employed, the charges of lubricant in the center disc will appear through the imperforate outer discs as intended to be illustrated in Fig 2.

This feature of transparency is a desirable attribute as showing at a glance whether lubricant is actually present or how much of it is carried by the center disc, but it is contemplated that non-transparent plastic may be used, in which event, inspection for lubricant may be effected by slipping one or the other of the outer cover discs from the covering position over the intermediate disc.

The smaller perforations through the center disc enable the lubricant in each cavity to reach the cover discs at both sides of the same and this results in better distribution of lubricant over the meeting faces of the opposing discs.

The motion of the parts between which the washer is mounted may cause relative rotational movement between the discs and this may be desirable for distributing films of lubricant between the meeting faces of the discs. This distribution of films of lubricant also is desirable for retaining the discs in their assembled order. If desired however, the washer units may be packed in envelopes, capsules or the like, to be removed at the time of installing the washers or possibly if of cellophane or other non-objectionable plastic or the like, to be left in place even when the washers are installed.

In the illustration, the washer discs are shown as of substantially the same diameter and thickness and considered as of the same material. It is contemplated however, that the different washer discs may be of different thickness, material and size, as may suit particular needs and requirements.

In the construction illustrated in Fig. 1, one of the bearing members 9, has an annular flange 16, about the edge thereof surrounding and confining the washer and rotatably engaging over the edge of the other bearing member 8. This is a desirable feature for keeping out dust and moisture and for confining any lubricant that might work out to the outer edge of the washer, but is not considered essential, since the laminations sealed as they are to each other by the lubricant, have the effect of excluding dust and moisture and foreign matter in general.

A nut and screw combination is indicated at 17, in Fig. 1, for setting the bearing elements 8, 9, up tight or to a desirably firm engagement with the washer. Usually, enough pressure may be applied to assure some distribution of the lubricant between the opposing faces of the washer discs. The washer then serves as a cushioning and shock absorbing element between opposed bearing faces, preventing rattling or undesirable loose motion.

The invention has many uses and has the advantage that it may be produced at low cost and may be installed as simply as an ordinary washer.

Because of the tenacity of the laminated discs, the washer may be handled quite freely without coming apart and this, in use, makes it practically vibration-proof. Plastics of different character may be used, depending to some extent on what use the washer is to be put. Bakelite and vinyl base plastics have been found quite suitable, when sufficiently soft and pliable.

The discs being relatively rotatable in respect to each other and in respect to the center disc, no harm results if the outer discs should stick to parts against which they may be in abutting engagement.

For some purposes, such as to hold a greater amount of lubrication, the center disc may be thicker than the outer discs and, if desired, may be stiffer, or possibly, more resilient than the other discs.

While the washer may be flat or substantially so, it is contemplated that it may be made up in other shapes such as conical or spherical, the latter particularly for ball and socket joints.

The invention has many advantages, particularly in regard to reducing friction, cushioning and providing shock absorption. The plastic layers are weatherproof and unaffected by ordinary temperature changes. The plastic being somewhat pliable, does not crack or break and stands up well under load and wear conditions.

What is claimed is:

1. Self-lubricating and rattle preventing spacing washer engageable between pivotally and rotatably connected parts, comprising laminations of plastic in flat back-to-back engagement and having a central stud, bolt or axle passage therethrough, there being at least three of said laminations, including an intermediate lamination having lubricant retaining cavities in opposite faces of the same and imperforate laminations at opposite faces of said intermediate laminations with heavy grease-like lubricant confined in said cavities by said imperforate laminations and exposed for distribution over the opposing faces of the laminations.

2. The invention according to claim 1, in which said cavities in the intermediate lamination are in the form of small perforations extending entirely through that lamination and in which said laminations, except for confinement by the lubricant, are free for relative rotation to effect distribution from the perforations in the intermediate imperforate laminations to the laminations at opposite sides of tthe same.

3. Self-lubricating spacing washer for location between pivotally and rotatably connected parts comprising laminations of soft pliable plastic in face-to-face relatively rotatable engagement and having a central bolt or stud passage therethrough, there being at least three of said laminations including an intermediate lamination having lubricant retaining cavities in opposite faces of the same and imperforate laminations at the opposite faces of said intermediate lamination covering the cavities in the opposite faces of the latter.

References Cited in the file of this patent

UNITED STATES PATENTS

| | | |
|---|---|---|
| 378,978 | Ryan | Mar. 6, 1888 |
| 2,675,283 | Thomson | Apr. 13, 1954 |